United States Patent
Dussel et al.

(10) Patent No.: US 8,734,076 B2
(45) Date of Patent: May 27, 2014

(54) RIVET AND METHOD FOR RIVETING COMPONENTS

(75) Inventors: Klaus Dussel, Lichtenau (DE); Dominique Wagner, Baerendorf (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 217 days.

(21) Appl. No.: 13/164,916

(22) Filed: Jun. 21, 2011

(65) Prior Publication Data

US 2011/0315504 A1    Dec. 29, 2011

(30) Foreign Application Priority Data

Jun. 29, 2010   (DE) .......................... 10 2010 025 409

(51) Int. Cl.
   *F16B 19/06*    (2006.01)
(52) U.S. Cl.
   CPC ..................................... *F16B 19/06* (2013.01)
   USPC ......................................... 411/504; 411/501
(58) Field of Classification Search
   USPC ........................ 411/501, 504, 506
   See application file for complete search history.

(56) References Cited

U.S. PATENT DOCUMENTS

| | | | | |
|---|---|---|---|---|
| 384,318 A * | 6/1888 | Kirks | | 411/501 |
| 565,049 A * | 8/1896 | Test | | 470/32 |
| 2,366,510 A * | 1/1945 | Louis | | 411/445 |
| 2,393,564 A * | 1/1946 | Poupitch | | 411/504 |
| 2,431,853 A * | 12/1947 | Dolch, Jr. et al. | | 29/888.452 |
| 2,663,270 A * | 12/1953 | Friedly | | 52/483.1 |
| 3,479,727 A * | 11/1969 | Colautti et al. | | 29/444 |
| 3,626,531 A * | 12/1971 | Mazer | | 148/607 |
| 3,762,266 A * | 10/1973 | Thellmann | | 411/501 |
| 3,848,389 A * | 11/1974 | Gapp et al. | | 411/504 |
| 3,911,783 A * | 10/1975 | Gapp et al. | | 411/504 |
| 4,528,739 A * | 7/1985 | Kemp | | 29/509 |
| 5,333,980 A * | 8/1994 | Pratt et al. | | 411/501 |
| 6,267,684 B1 * | 7/2001 | Luhm | | 470/16 |
| 6,988,862 B1 * | 1/2006 | Iguchi et al. | | 411/501 |
| 7,563,064 B2 * | 7/2009 | Seigneur et al. | | 411/504 |
| 2004/0000280 A1 * | 1/2004 | Griffin et al. | | 123/90.44 |

* cited by examiner

*Primary Examiner* — Flemming Saether

(74) *Attorney, Agent, or Firm* — Lucas & Mercanti, LLP

(57) ABSTRACT

A rivet, in particular a solid rivet, for riveting components, which has a primary head for bearing on a component to be riveted and a rivet shank, which is plastically deformable to form a closing head, joined to the primary head so as to constitute a single piece therewith. The primary head has a greater hardness than the rivet shank. Owing to the greater hardness of the primary head, the rivet joint can be produced in a reliable and cost effective manner, even in the case of a rivet header bearing only partially on the primary head.

20 Claims, 4 Drawing Sheets

RIVET AND METHOD FOR RIVETING COMPONENTS

CROSS-REFERENCE TO RELATED APPLICATIONS

This application claims the priority of DE 2010 025 409.6 filed Jun. 29, 2010, which is incorporated by reference herein.

FIELD OF THE INVENTION

The invention relates to a rivet and to a method for riveting components, and more specifically to joining of components of a clutch for a motor vehicle to each another via a riveted joint.

BACKGROUND OF THE INVENTION

Known in the case of a clutch is the practice whereby a contact pressure plate that is to be movable onto a clutch disk is joined by means of a rivet, via a riveted joint, to an actuating element for moving the contact pressure plate. A joint that is solid, permanent and secure against loss is thereby created between the actuating element and the contact pressure plate, it being possible for the adequacy of the joint quality to be checked even during an assembly operation. For the purpose of producing the riveted joint, the rivet is inserted in a through opening realized in the components to be riveted. A primary head of the rivet is held by means of a rivet header, while, at the opposite side of the rivet, a rivet shank, joined to the primary head so as to constitute a single piece therewith, is plastically deformed, by means of a riveting tool, to form a closing head, such that the components to be riveted are fixedly joined to one another substantially in the axial direction along the rivet shank, between the primary head and the closing head.

In the case of such a riveted joint, it is disadvantageous that, in the case of particularly restricted construction spaces, further components can constitute an obstruction, which components, for example, make it difficult to place the rivet header onto the primary head. This can have the result that, during the production of the riveted joint, the rivet header bears only partially on the primary head, as a result of which a gap, which weakens the riveted joint, can ensue between the primary head and the components to be joined. In order reliably to prevent such a weakening of the riveted joint, in the case of particularly restricted construction spaces it is considered to be absolutely essential to produce a riveted joint only by means of a blind rivet, which, owing to an additional sleeve and the more complicated geometry of the rivet, is considerably more expensive.

It is the object of the invention to specify measures by means of which, in the case of restricted construction spaces, components of a clutch for a motor vehicle can be joined to each other in an inexpensive and secure manner.

SUMMARY OF THE INVENTION

The object is achieved, according to the invention, by a rivet and a method for riveting components.

Broadly, the invention is a rivet, in particular a solid rivet, for riveting components, which has a primary head for bearing on a component to be riveted, and a rivet shank, which is plastically deformable to form a closing head, joined to the primary head so as to constitute a single piece therewith. According to the invention, the primary head has a greater hardness than the rivet shank.

Owing to the greater hardness of the primary head in comparison with the rivet shank, a greater resistance against plastic deformation is provided by the primary head in comparison with the rivet shank, such that, even in the case of a rivet header bearing only partially on the primary head, the part of the primary head with which the rivet header does not coincide is prevented from bending away. It is thereby possible to produce a secure riveted joint, even in the case of particularly restricted construction spaces that, owing to obstructing components partially projecting over the primary head, prevent the rivet header from being placed fully on the primary head. In particular, it is not necessary to produce the riveted joint by means of a blind rivet, such that, in comparison with a blind rivet, the rivet according to the invention allows a more cost effective joining of components to be riveted. As a result, in automobile construction, in particular, by means of the rivet according to the invention, screwed joints can be replaced by riveted joints at a multiplicity of joint locations in restricted construction spaces. Particularly preferably, in the case of clutches, in particular double clutches, for a drive train of a motor vehicle, components can be riveted by means of the rivet according to the invention, such that, even in the case of a particularly compact mode of construction with particularly restricted construction spaces, it is possible for the components of the clutch to be joined in a secure and more cost effective manner.

The primary head and the rivet shank can be produced, so as to constitute a single piece, from a material suitable for plastic deforming, the primary head being such that it can be hardened subsequently by a suitable method, in particular after production of the basic form of the rivet. For example, the rivet can be subjected to a heat treatment, the primary head being abruptly quenched when the rivet is in the heated state, in order to produce structural changes in the region of the primary head as a result of the abrupt cooling. Further, the primary head can be subsequently hardened by a surface treatment, for example nitriding.

In particular, a difference $\Delta H$ between the hardness $H_K$ of the primary head and the hardness $H_S$ of the rivet shank is 150 HV≤$\Delta H$≤400 HV, in particular 200 HV≤$\Delta H$≤350 HV, and preferably 250 HV≤$\Delta H$≤300 HV. The hardness of the primary head and of the rivet shank are determined by a Vickers hardness (HV) test in accordance with DIN EN ISO 6507. Such a hardness difference is sufficient to prevent a significant gap between the primary head and the components to be riveted, even in the case of an only partial contact between the rivet header and the primary head. In particular, it is sufficient if the rivet header covers only maximally 80%, preferably maximally 60%, particularly preferably maximally 50% and further preferably maximally 40% of the axial, outwardly facing surface of the primary head.

Preferably, a ratio $V$ of the hardness $H_K$ of the primary head in relation to the hardness $H_S$ of the rivet shank is 1.0<$V$≤5.0, in particular 1.5≤$V$≤4.0, preferably 2.0≤$V$≤3.5, and particularly preferably 2.5≤$V$≤3.0. Such a ratio of the hardness of the primary head to the hardness of the rivet shank enables a secure rivet joint to be achieved, even in the case of the rivet header being placed only partially onto the primary head, in particular to the extent described above. It is thereby possible to prevent a gap between a region of the primary head with which the rivet header does not coincide and the component to be riveted.

Particularly preferably, the hardness $H_S$ of the rivet shank is 100 HV≤$H_S$≤250 HV, in particular 150 HV≤$H_S$≤200 HV, and preferably 170 HV≤$H_S$≤180 HV, the hardness of the primary head being 350 HV≤$H_S$≤550 HV, in particular 400 HV≤$H_S$≤500 HV, and preferably $H_S$=450 HV±30 HV. In the case of such hardnesses for the primary head and the rivet shank, galvanized steel, for example, can be used as a material for the rivet. In the case of such hardnesses it is possible to produce, in particular for automobile construction, suitable riveted joints that can provide a sufficient holding force for the components to be riveted, in particular for clutches. A gap between the primary head and the component to be riveted can thereby be prevented even in the case, as described above, of a rivet header bearing only partially on the primary head.

In particular, the primary head and the rivet shank are produced from a basic material that contains iron, in particular steel. An iron-carbon steel is easily plastically deformed during riveting, hardening of the primary head being easily possible at the same time.

The invention further relates to a clutch, in particular a double clutch, having at least one contact pressure plate for closing the clutch through a movement of the contact pressure plate, and having an actuating element for moving the contact pressure plate, in particular an actuating lever or actuating spring, the actuating element being riveted to the contact pressure plate by means of a rivet that can be realized and developed as described above. This enables the actuating element to be fastened to the contact pressure plate in a cost effective and secure manner, even in the case of particularly restricted construction spaces.

A clutch cover that at least partially covers the contact pressure plate is preferably provided, the clutch cover partially coinciding with the primary head of the rivet. The clutch cover, as an obstructing component, can be disposed at least partially in the axial alignment of the primary head that is actually provided for the rivet header, without impairing a secure riveting as a result of the rivet header bearing only partially on the primary head.

Preferably, the clutch cover has a centric or eccentric hole disposed in relation to the primary head, for the through passage of a rivet header, the rivet header being designed, in particular, to coincide only partially with the primary head. The hole enables the maximum cross-section of the rivet header to be limited to a cross-section that is less than the cross-section of the primary head. The hole provided in the clutch cover can thereby be kept so small that the strength of the clutch cover is not impaired, or at least is not reduced. With a sufficient or even increased solidity of the clutch cover, it is possible to achieve a secure and more cost effective riveting of components of the clutch. A weakening of the strength of the clutch cover can thereby be prevented, or at least reduced, without making it necessary to use a blind rivet for the riveted joint.

In a preferred embodiment, the primary head has a positioning aid, in particular an axial recess or an axial projection, in order to place the rivet header at a defined location centrically or eccentrically onto the primary head. A lateral displacement of the primary head relative to the rivet shank during riveting is thereby prevented, despite the rivet header bearing only partially on the primary head. The positioning aid is disposed, in particular, coaxially in relation to the rivet shank, such that the rivet header can be placed centrically on the primary head. As a result, it is not necessary for the rivet header to encompass the primary head radially on the outside. As a result, the rivet header can be designed so as to be particularly narrow, having a relatively small cross-section, in particular in a region facing towards the rivet, such that the rivet header can be used at locations that are difficult to access, even in the case of particularly restricted construction spaces.

The invention further relates to a method for riveting components, in particular for riveting a contact pressure plate of a clutch to an actuating element, wherein there is effected providing the components to be riveted, and inserting a rivet into a through opening realized in the components, the rivet being such that it can be realized and developed as described above. Further effected are only partially placing a rivet header onto the primary head of the rivet and plastically deforming the rivet shank to form a closing head. Owing to the greater hardness of the primary head in comparison with the rivet shank, a cost effective and secure riveted joint can be produced, without a significant gap between the primary head and the components to be joined, even in the case of the rivet header bearing only partially on the primary head, the use of a blind rivet being unnecessary. The rivet can be designed, in particular, as a solid rivet.

In particular, before the rivet header is placed on, an obstructing component, in particular a clutch cover, which projects partially over the primary head of the rivet, is provided. This makes it possible for the riveting of the components to be performed at a relatively late point in time, as a result of which the assembly of a plurality of components can be simplified, owing to the lesser restrictions in the construction sequence. This enables a simplified and more cost effective assembly of components to be riveted in a larger overall system, for example of a clutch or double clutch of a motor vehicle.

BRIEF DESCRIPTION OF THE DRAWINGS

The invention is explained exemplarily below, on the basis of preferred exemplary embodiments, with reference to the appended drawings, wherein.

DETAILED DESCRIPTION OF THE INVENTION

Figure 1:
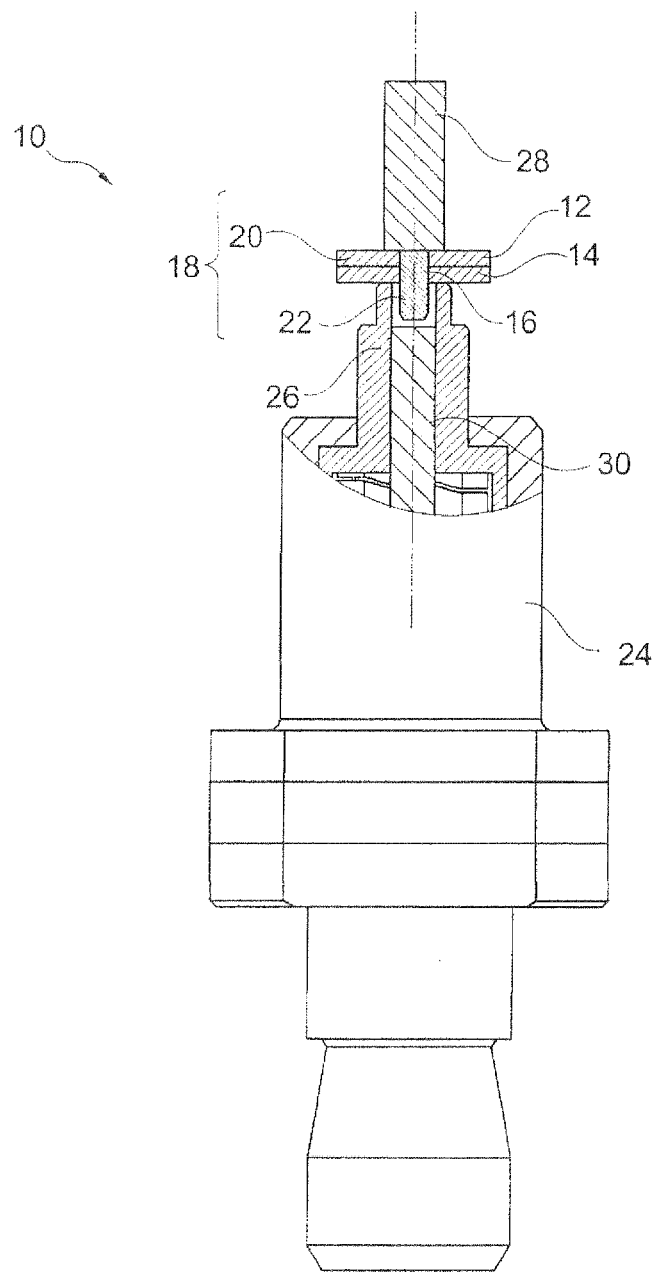
FIG. 1 shows a schematic, partial-section side view of a riveting arrangement according to the prior art.

In the case of the known riveting arrangement 10 represented in FIG. 1, a first component 12 and a second component 14 are disposed over one another. The components 12, 14 realize a through opening 16, in which a rivet 18 is inserted. The rivet 18 has a primary head 20 and has a rivet shank 22, which is joined to the primary head 20 so as to constitute a single piece therewith. The rivet shank 22 can be plastically deformed, by means of a riveting tool 24, to form a closing head 48. For this purpose, the riveting tool 24, by means of a hold-down device 26, can press the components 12, 14 together against the primary head 20. A sufficient counter-force can be provided for the riveting tool 28 via a rivet header 28, which covers the primary head 20 completely. By means of a bolt 30 that is movable relative to the hold-down device 26, the rivet shank 22 can be plastically deformed to form a closing head 48, such that the primary head 20 and the closing head of the deformed rivet shank 22 can bear on the respective component 12, 14 without a significant gap.

Figure 2:
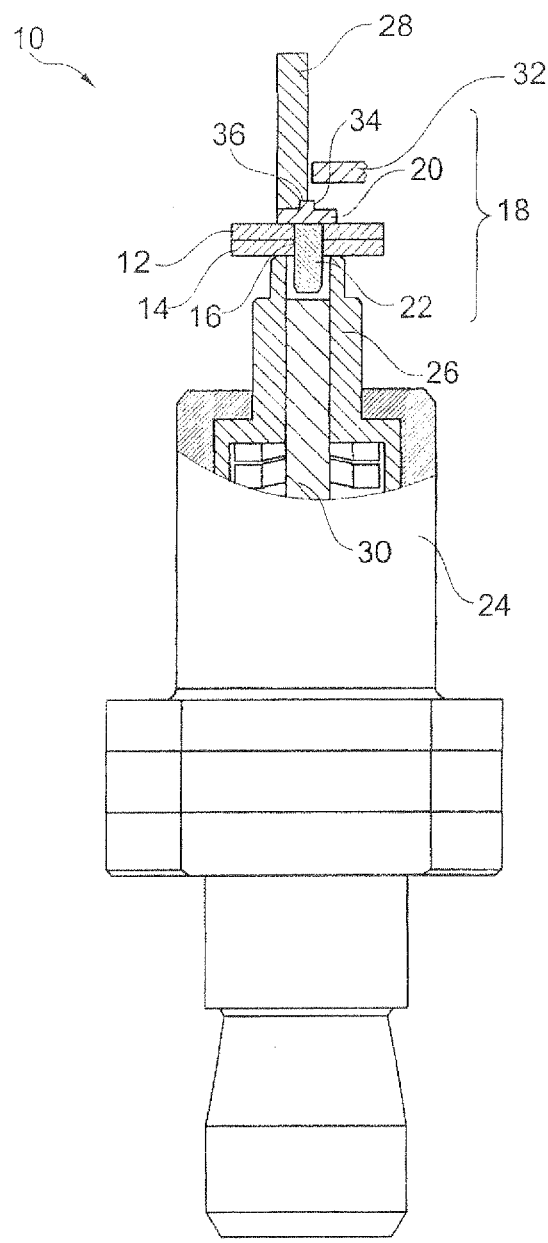
FIG. 2 shows a schematic, partial-section side view of a riveting arrangement in a first embodiment, with a rivet according to the invention.

In the case of the riveting arrangement 10 according to the invention that is represented in FIG. 2, an obstructing component 32, which projects partially over the primary head 20, is additionally provided, such that the rivet header 28 can bear only partially on the primary head 20. The primary head 20 has a projection 34, which protrudes from the rivet shank 22 in the axial direction and which can engage, as a positioning aid, in a corresponding opening 36 of the rivet header 28. In the exemplary embodiment represented, the rivet header 28 can have a lesser cross-section in the axial direction and, consequently, can be guided past the obstructing component 32. Owing to the greater hardness of the primary head 20, it is ensured that, after the plastic deforming of the rivet shank 22, a gap between the primary head 20 and the first component 12 is prevented, even in the region of the primary head 20 with which the obstructing component 32 coincides and on which the rivet header 28 cannot bear.

Figure 3:
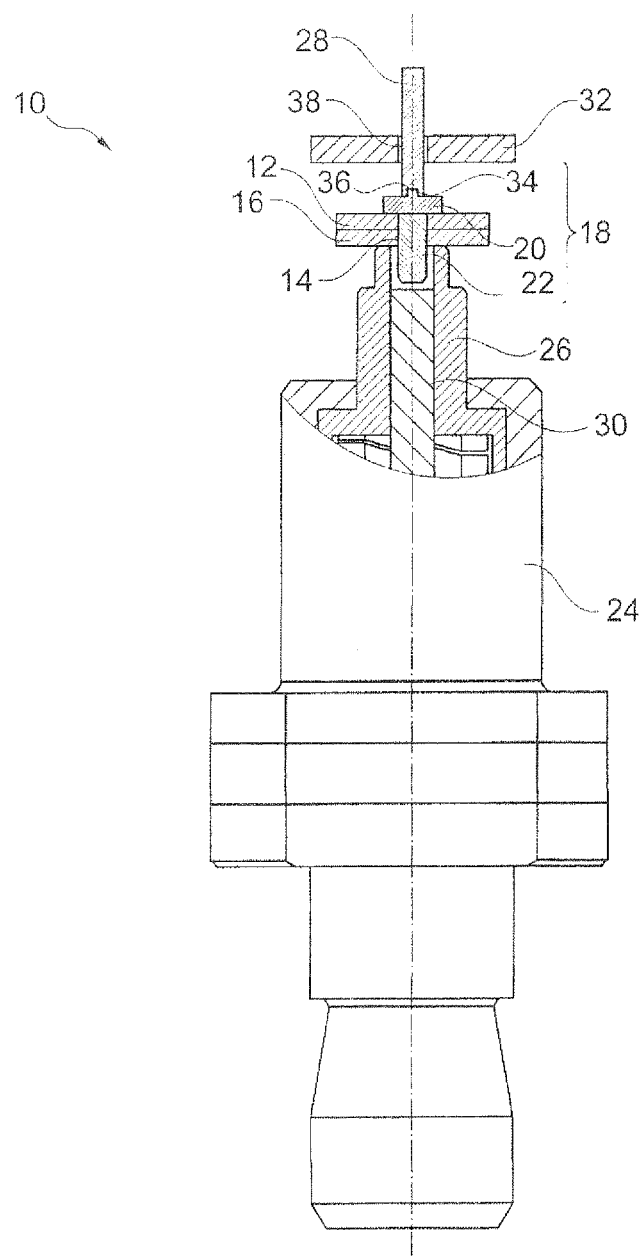
FIG. 3 shows a schematic, partial-section side view of a riveting arrangement in a second embodiment, with the rivet according to the invention.

In the case of the riveting arrangement 10 according to the invention that is represented in FIG. 3, the obstructing component 32 has a hole 38 disposed coaxially in relation to the rivet shank 22, such that the rivet header 28 can bear centrically, but only partially, on the primary head 20. Owing to the increased hardness of the primary head 20 relative to the rivet shank 22, a gap between the primary head 20 and the first component 12 is prevented at the region of the primary head 20 that protrudes radially in relation to the rivet header 28.

Figure 4:
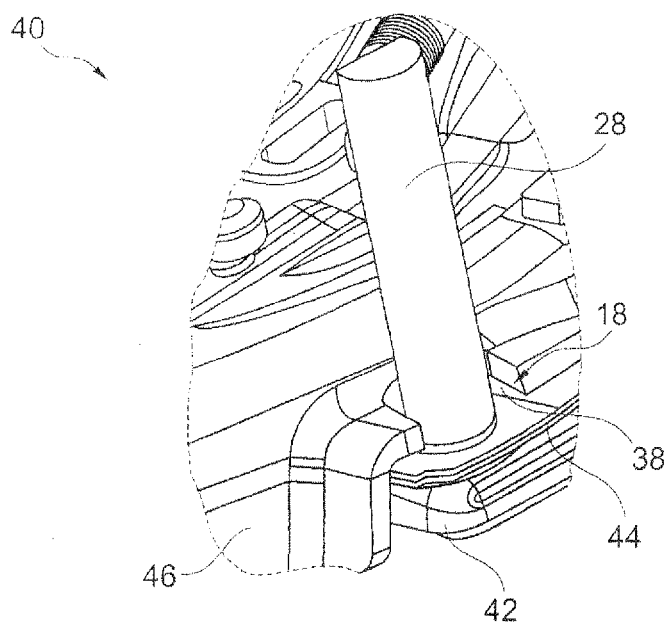
FIG. 4 shows a schematic, perspective partial view of a clutch, with the rivet according to the invention.
Figure 5:
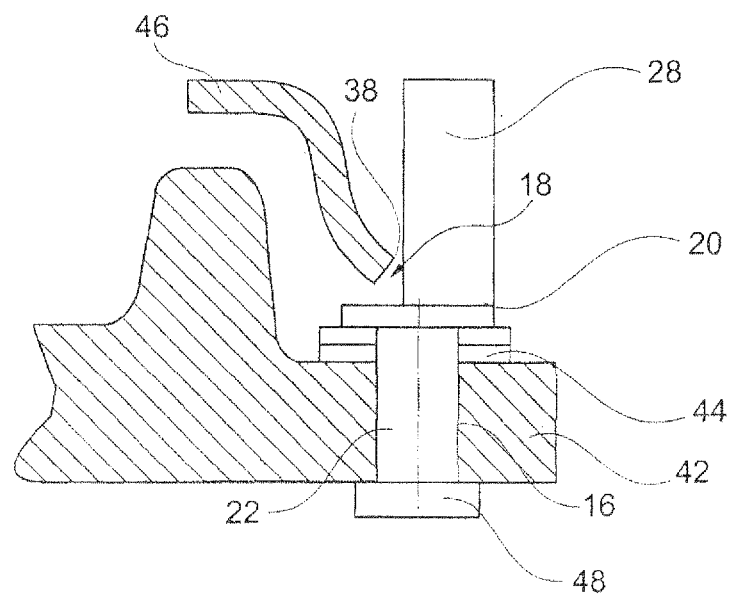
FIG. 5 shows a schematic sectional view of the clutch from FIG. 4.

The clutch 40, represented partially in FIGS. 4 and 5, has a pressure contact plate 42 and has an actuating element, in the form of a leaf spring 44, for axially moving the contact pressure plate 42. A clutch cover 46 coincides, at least partially, with the contact pressure plate 42. The contact pressure plate 42 and the leaf spring 44 are joined to each other by means of the rivet 18 according to the invention. The rivet shank 22 is plastically deformed by the riveting tool 24 in such a way that the rivet shank 22 realizes a closing head 48, which bears on the contact pressure plate 42. The clutch cover 46 partially coincides with the primary head 20. The clutch cover 46 additionally has the hole 38, such that the rivet header 28 can bear partially on the primary head 20, eccentrically in relation to the rivet 18.

| List of References | |
|---|---|
| 10 | Riveting Arrangement |
| 12 | First Component |
| 14 | Second Component |
| 16 | Through Opening |
| 18 | Rivet |
| 20 | Primary Head |
| 22 | Rivet Shank |
| 24 | Riveting Tool |
| 26 | Hold-Down Device |
| 28 | Rivet Header |
| 30 | Bolt |
| 32 | Obstructing Component |
| 34 | Projection |
| 36 | Opening |
| 38 | Hole |
| 40 | Clutch |
| 42 | Contact Pressure Plate |
| 44 | Leaf Spring |
| 46 | Clutch Cover |
| 48 | Closing Head |

The invention claimed is:

1. A rivet for riveting components, comprising:
a primary head for bearing on one of the components to be riveted; and
a rivet shank, which is plastically deformable to form a closing head, extending from a bottom of the primary head such that the primary head and the rivet shank are formed as a single piece of material with the primary head having a greater hardness than an entire portion of the rivet shank,
the primary head having a projection on a side of the primary head facing away from the rivet shank for engaging a rivet header as a positioning aid, the projection being part of the primary head and the entire projection having a same hardness as the primary head.

2. The rivet according to claim 1, wherein a difference between the hardness of the primary head and the hardness of the rivet shank is 150 HV≤ΔH≤400 HV.

3. The rivet according to claim 1, wherein a difference between the hardness of the primary head and the hardness of the rivet shank is 200 HV≤ΔH≤350 HV.

4. The rivet according to claim 1, wherein a difference between the hardness of the primary head and the hardness of the rivet shank is 250 HV≤ΔH≤300 HV.

5. The rivet according to claim 1, wherein a ratio of the hardness of the primary head in relation to the hardness of the rivet shank is 1.0<V≤5.0.

6. The rivet according to claim 1, wherein a ratio of the hardness of the primary head in relation to the hardness of the rivet shank is 1.5≤V≤4.0.

7. The rivet according to claim 1, wherein a ratio of the hardness of the primary head in relation to the hardness of the rivet shank is 2.0≤V≤3.5.

8. The rivet according to claim 1, wherein a ratio of the hardness of the primary head in relation to the hardness of the rivet shank is 2.5≤V≤3.0.

9. The rivet according to claim 1, wherein the hardness of the rivet shank is 100 HV≤$H_S$≤250 HV and the hardness of the primary head is 350 HV≤$H_S$≤550 HV.

10. The rivet according to claim 1, wherein the hardness of the rivet shank is 150 HV≤$H_S$≤200 HV and the hardness of the primary head is 400 HV≤$H_S$≤500 HV.

11. The rivet according to claim 1, wherein the hardness of the rivet shank is 170 HV≤$H_S$≤180 HV and the hardness of the primary head is 450 HV±30 HV.

12. The rivet according to claim 1, wherein the primary head and the rivet shank are produced from a material that contains iron.

13. A clutch, comprising:
at least one contact pressure plate for closing the clutch through a movement of the contact pressure plate; and
an actuating element for moving the contact pressure plate; and
a rivet joining the actuating element to the contact pressure plate, the rivet comprising a primary head for bearing on one of the components to be riveted and a rivet shank, which is plastically deformable to form a closing head, extending from a bottom of the primary head such that the primary head and the rivet shank are formed as a single piece with the primary head having a greater hardness than an entire portion of the rivet shank, the primary head having a projection on a side of the primary head facing away from the rivet shank for engaging a rivet header as a positioning aid, the projection being part of the primary head and the entire projection having a same hardness as the primary head.

14. The clutch according to claim 13, wherein the pressure plate is an actuating lever or actuating spring.

15. The clutch according to claim 13, further comprising a clutch cover that at least partially covers the contact pressure plate and the primary head of the rivet.

16. The clutch according to claim 15, wherein the rivet has a header that coincides with the primary head and the clutch cover has a centric or eccentric hole disposed in relation to the primary head for through passage of a rivet header.

17. A method for riveting components having a through hole, the method comprising the steps of:
provide the components to be riveted;
inserting a rivet, which comprises a primary head for bearing on one of the components to be riveted and a rivet shank, which is plastically deformable to form a closing head, extending from a bottom of the primary head such that the primary head and the rivet shank are formed as a single piece with the primary head having a greater hardness than an entire portion of the rivet shank, into the through opening realized in the components, the primary head having a projection on a side of the primary head facing away from the rivet shank for engaging a rivet header as a positioning aid, the projection being part of the primary head and the entire projection having a same hardness as the primary head;

only partially placing a rivet header onto the primary head of the rivet; and
plastically deforming the rivet shank to form a closing head.

18. The method according to claim 17, wherein the components to be riveted together are a contact pressure plate of a clutch and an actuating element.

19. The method according to claim 18, wherein an obstructing component projects partially over the primary head of the rivet before the rivet header is placed on the primary head of the rivet.

20. The method according to claim 19, wherein a clutch cover projects partially over the primary head of the rivet before the rivet header is placed on the primary head of the rivet.

* * * * *